(12) United States Patent
Guo et al.

(10) Patent No.: US 12,702,949 B2
(45) Date of Patent: Aug. 11, 2026

(54) SYSTEM AND METHOD FOR PURIFYING HYDROGEN, AND SYSTEM FOR PRODUCING HYDROGEN BY WATER ELECTROLYSIS

(71) Applicant: WUXI LONGI HYDROGEN TECHNOLOGY CO., LTD., Wuxi (CN)

(72) Inventors: Luning Guo, Wuxi (CN); Gaofa Wang, Wuxi (CN)

(73) Assignee: WUXI LONGI HYDROGEN TECHNOLOGY CO., LTD., Wuxi (CN)

(*) Notice: Subject to any disclaimer, the term of this patent is extended or adjusted under 35 U.S.C. 154(b) by 330 days.

(21) Appl. No.: 18/706,181

(22) PCT Filed: Jul. 5, 2022

(86) PCT No.: PCT/CN2022/103910
§ 371 (c)(1),
(2) Date: May 16, 2024

(87) PCT Pub. No.: WO2023/071281
PCT Pub. Date: May 4, 2023

(65) Prior Publication Data

US 2025/0303356 A1 Oct. 2, 2025

(30) Foreign Application Priority Data

Oct. 30, 2021 (CN) ......................... 202111277993.3

(51) Int. Cl.
*B01D 53/26* (2006.01)
*B01D 53/04* (2006.01)
(Continued)

(52) U.S. Cl.
CPC ....... *B01D 53/261* (2013.01); *B01D 53/0438* (2013.01); *C25B 1/04* (2013.01);
(Continued)

(58) Field of Classification Search
CPC .............. B01D 53/261; B01D 2257/80; B01D 2257/104; B01D 53/0438; B01D 53/0446;
(Continued)

(56) References Cited

U.S. PATENT DOCUMENTS 2,995,208 A * 8/1961 Hachmuth ............. B01D 53/04 165/4
3,712,027 A * 1/1973 Hasz ......................... C07C 7/12 95/143
4,726,818 A * 2/1988 Yeung ................... B01D 15/00 95/124

FOREIGN PATENT DOCUMENTS

CN 1920100 A 2/2007
CN 102020246 A 4/2011
(Continued)

OTHER PUBLICATIONS

International Search Report and Written Opinion in Appln. No. PCT/CN2022/103910, mailed on Sep. 14, 2022, 19 pages (with English translation).
(Continued)

*Primary Examiner* — Robert Clemente
(74) *Attorney, Agent, or Firm* — Fish & Richardson P.C.

(57) ABSTRACT

Disclosed are a system and method for purifying hydrogen, and a system for producing hydrogen by water electrolysis. The system for purifying hydrogen includes three dryers, and the three dryers share one regeneration cycle module. This significantly reduces a quantity of regeneration cycle modules, and therefore, manufacturing cost of the system is relatively low. In addition, a first gas-gas heat exchanger (4) is arranged in a regeneration cycle system, so that heat
(Continued)

exchange can be performed between low-temperature regeneration hydrogen before regeneration and high-temperature regeneration tail gas after regeneration. In this way, residual heat of the high-temperature regeneration tail gas can be fully utilized, and power consumption of a subsequent heater and regeneration cooler can be significantly reduced. Therefore, energy consumption of the system is relatively low.

20 Claims, 1 Drawing Sheet

(51) Int. Cl.
*C25B 1/04* (2021.01)
*C25B 15/08* (2006.01)

(52) U.S. Cl.
CPC ...... *C25B 15/083* (2021.01); *B01D 2257/104* (2013.01); *B01D 2257/80* (2013.01); *B01D 2259/403* (2013.01)

(58) Field of Classification Search
CPC ...... B01D 53/0462; B01D 2259/40054; B01D 2259/403; B01D 53/28; C25B 1/04; C25B 15/083; C01B 2203/042
See application file for complete search history.

(56) References Cited

FOREIGN PATENT DOCUMENTS

| | | | |
|---|---|---|---|
| CN | 103143240 | A | 6/2013 |
| CN | 104627963 | A | 5/2015 |
| CN | 107434243 | A | 12/2017 |
| CN | 108341398 | A | 7/2018 |
| CN | 209865719 | U | 12/2019 |
| CN | 212050524 | U | 12/2020 |
| CN | 112390228 | A | 2/2021 |
| CN | 213708495 | U | 7/2021 |
| CN | 216878638 | U | 7/2022 |
| FR | 1483519 | A | 6/1967 |
| JP | 2000272905 | A | 10/2000 |
| WO | WO 2016024456 | A1 | 2/2016 |

OTHER PUBLICATIONS

Haley, "Performance Characterization of an Integrated Microscale Hydrogen Combustor Recuperator and Oil Heat Exchanger," Thesis for the degree of Master of Science, Oregon State University, Mechanical Engineering, Jun. 2011, 217 pages.
Shah, "Hydrogen Purification Technologies Overview," Paper, Presented at the Proceedings of the ARPA-E Methane Pyrolysis Annual Program Review Virtual Meeting, Jan. 12, 2021, 9 pages.
Office Action in Australian Appln. No. 2022374739, mailed on Dec. 4, 2025, 6 pages.

* cited by examiner

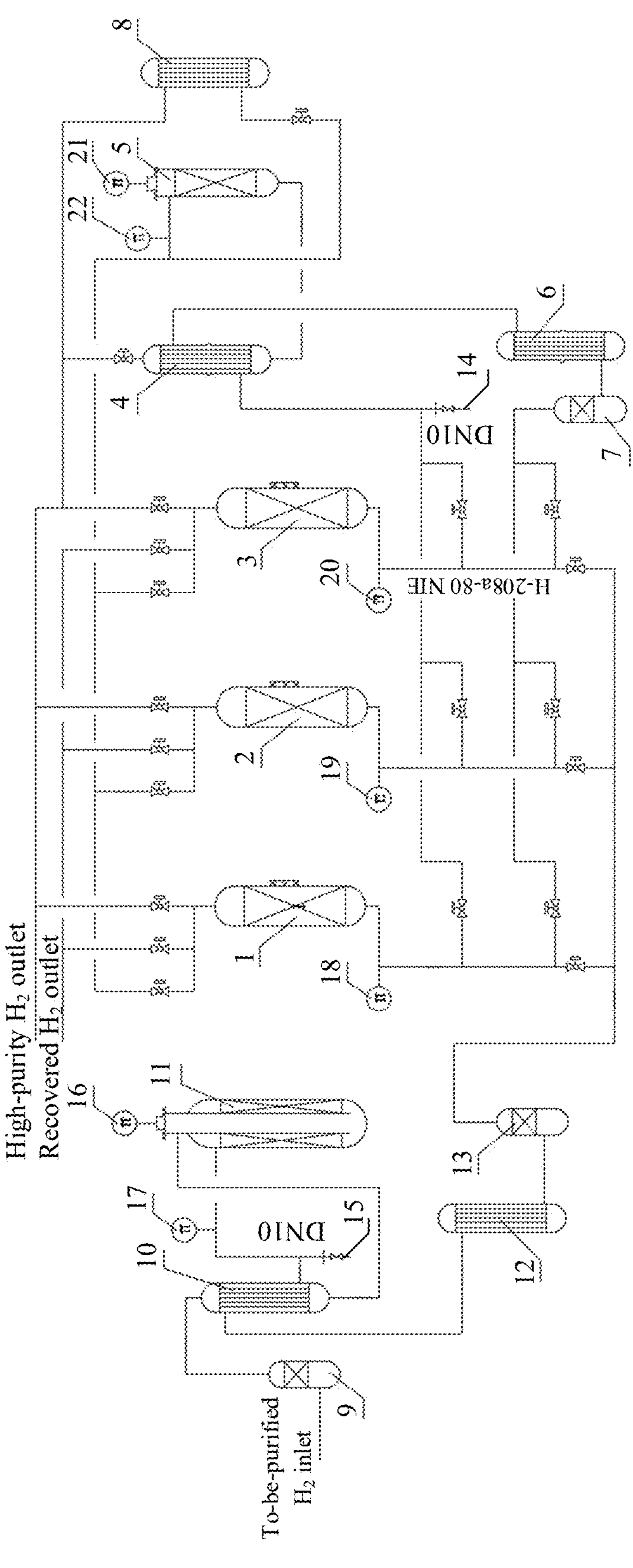
High-purity $H_2$ outlet
Recovered $H_2$ outlet
To-be-purified $H_2$ inlet
DN10
DN10
1
2
3
4
5
6
7
8
9
10
11
12
13
14
15
16
17
18
19
20
21
22

SYSTEM AND METHOD FOR PURIFYING HYDROGEN, AND SYSTEM FOR PRODUCING HYDROGEN BY WATER ELECTROLYSIS

CROSS-REFERENCE TO RELATED APPLICATIONS

This application is a 371 National Stage Application of International Application No. PCT/CN2022/103910, filed on Jul. 5, 2022, which claims priority to Chinese Patent Application No. 202111277993.3, filed on Oct. 30, 2021. Both of the aforementioned applications are hereby incorporated by reference in their entireties.

TECHNICAL FIELD

This application relates to the field of hydrogen purification technologies, and specifically, to a system and method for purifying hydrogen, and a system for producing hydrogen by water electrolysis.

BACKGROUND

Hydrogen produced by water electrolysis is mixed with a trace amount of oxygen and a large amount of water vapor. The hydrogen produced by water electrolysis needs to be purified to obtain high-purity hydrogen.

Chinese Patent NO. CN1920100A discloses an apparatus for continuously purifying hydrogen produced by water electrolysis. The apparatus includes three drying towers. Each drying tower is equipped with an electric heating rod for heating to create a high-temperature environment during regeneration of a desiccant in the drying tower. Each drying tower is externally connected to a regeneration cooler for cooling high-temperature regeneration tail gas generated during regeneration of the desiccant.

The apparatus has many electric heating rods and coolers, and does not make full use of residual heat of the high-temperature regeneration tail gas, consequently causing relatively high manufacturing cost and waste of energy.

SUMMARY

An objective of this application is to resolve problems of relatively high manufacturing cost and waste of energy in an existing apparatus for purifying hydrogen. In view of this, a system and method for purifying hydrogen, and a system for producing hydrogen by water electrolysis are provided.

To achieve the foregoing objective, this application provides a system for purifying hydrogen, for purifying a feed stream including hydrogen to generate a purified hydrogen stream, the system for purifying hydrogen including:

a deoxygenation module, a drying module, and a regeneration cycle module that are sequentially in communication with each other, where the drying module includes a first dryer, a second dryer, and a third dryer that are connected in parallel; and the regeneration cycle module includes a first gas-gas heat exchanger having a first gas channel and a second gas channel; and the system for purifying hydrogen further includes:

a first stream control module configured to allow the feed stream including hydrogen to sequentially flow through the deoxygenation module and the first dryer to form a purification channel, to obtain the purified hydrogen stream; and a second stream control module, configured to allow a portion of the purified hydrogen stream to sequentially flow through the first gas channel of the first gas-gas heat exchanger, the second dryer, the second gas channel of the first gas-gas heat exchanger, and the third dryer to form a regeneration channel, to obtain recycled hydrogen stream.

Optionally, the first dryer, the second dryer, and the third dryer are each provided with a first opening and a second opening, where the first opening of the first dryer, the first opening of the second dryer, and the first opening of the third dryer are configured to be respectively in communication with an outlet of the deoxygenation module, an inlet of the second gas channel of the first gas-gas heat exchanger, and an outlet of the second gas channel of the first gas-gas heat exchanger; and the second opening of the first dryer, the second opening of the second dryer, and the second opening of the third dryer are configured to be respectively in communication with a purified hydrogen stream outlet, an inlet of the first gas channel of the first gas-gas heat exchanger, and a recycled hydrogen stream outlet, where the purified hydrogen stream outlet is configured to output the purified hydrogen stream, and the recycled hydrogen stream outlet is configured to output the recycled hydrogen stream.

Optionally, the first stream control module includes at least one first control valve, and the second stream control module includes at least one second control valve, where:

the at least one first control valve is arranged between the outlet of the deoxygenation module and the first opening of each of the dryers and between the purified hydrogen stream outlet and the second opening of each of the dryers; and the at least one second control valve is arranged between the inlet of the first gas channel of the first gas-gas heat exchanger and the second opening of each of the dryers, between the inlet of the second gas channel of the first gas-gas heat exchanger and the first opening of each of the dryers, between the outlet of the second gas channel of the first gas-gas heat exchanger and the first opening of each of the dryers, and between the recycled hydrogen stream outlet and the second opening of each of the dryers.

Optionally, the regeneration cycle module further includes:

a cooler, configured to cool the second dryer; and a third stream control module, configured to allow a portion of the purified hydrogen stream to sequentially flow through the cooler, the second dryer, the second gas channel of the first gas-gas heat exchanger, and the third dryer, to form a regeneration cooling channel.

Optionally, an inlet of the cooler is configured to be respectively in communication with a second opening of the first dryer, a second opening of the second dryer, and a second opening of the third dryer, and an outlet of the cooler is configured to be respectively in communication with the second opening of the first dryer, the second opening of the second dryer, and the second opening of the third dryer.

Optionally, the third stream control module includes at least one third control valve, where the at least one third control valve is arranged between the inlet of the cooler and the second opening of each of the dryers and/or between the outlet of the cooler and the second opening of each of the dryers.

Optionally, the regeneration cycle module further includes a regeneration cooler and a first moisture separator, where an inlet of the regeneration cooler is in communication with an outlet of the second gas channel of the first gas-gas heat exchanger, an outlet of the regeneration cooler is in communication with an inlet of the first moisture separator, and an outlet of the first moisture separator is configured to be respectively in communication with a first opening of the first dryer, a first opening of the second dryer, or a first opening of the third dryer.

Optionally, the deoxygenation module includes a second gas-gas heat exchanger and a deoxygenator, and the second gas-gas heat exchanger has a first gas channel and a second gas channel, where an outlet of the first gas channel of the second gas-gas heat exchanger is in communication with an inlet of the deoxygenator, an outlet of the deoxygenator is in communication with an inlet of the second gas channel of the second gas-gas heat exchanger, and an outlet of the second gas channel of the second gas-gas heat exchanger is configured to be respectively in communication with a first opening of the first dryer, a first opening of the second dryer, or a first opening of the third dryer.

Optionally, the system for purifying hydrogen further includes a cooling condenser and a second moisture separator, where an inlet of the cooling condenser is in communication with the outlet of the second gas channel of the second gas-gas heat exchanger, an outlet of the cooling condenser is in communication with an inlet of the second moisture separator, and an outlet of the second moisture separator is configured to be respectively in communication with the first opening of the first dryer, the first opening of the second dryer, or the first opening of the third dryer.

Optionally, a first condensed water drain pipe is further arranged between an inlet of the second gas channel of the first gas-gas heat exchanger and the first opening of each of the dryers, where an end of the first condensed water drain pipe is in communication with both the inlet of the second gas channel of the first gas-gas heat exchanger and the first opening of each of the dryers;

- a second condensed water drain pipe is further arranged between the inlet of the second gas channel of the second gas-gas heat exchanger and the outlet of the deoxygenator, where the second condensed water drain pipe is in communication with both the inlet of the second gas channel of the second gas-gas heat exchanger and the outlet of the deoxygenator; and
- a control valve is arranged on each of the first condensed water drain pipe and the second condensed water drain pipe.

Optionally, a first temperature measurement device is arranged on the deoxygenator, a second temperature measurement device is arranged at the outlet of the deoxygenator, a third temperature measurement device is arranged at the first opening of the first dryer, a fourth temperature measurement device is arranged at the first opening of the second dryer, and a fifth temperature measurement device is arranged at the first opening of the third dryer.

Optionally, the regeneration cycle module further includes a heater; and

- the second stream control module is specifically configured to allow a portion of the purified hydrogen stream to sequentially flow through the first gas channel of the first gas-gas heat exchanger, the heater, the second dryer, the second gas channel of the first gas-gas heat exchanger, and the third dryer to form a regeneration channel, to obtain the recycled hydrogen stream.

Optionally, the second opening of the first dryer, the second opening of the second dryer, and the second opening of the third dryer are further configured to be respectively in communication with an outlet of the heater; and an outlet of the first gas channel of the first gas-gas heat exchanger is in communication with an inlet of the heater.

Optionally, the at least one second control valve is further arranged between an outlet of the heater and the second opening of each of the dryers.

Optionally, a sixth temperature measurement device is arranged on the heater, and a seventh temperature measurement device is arranged at an outlet of the heater.

Optionally, the first dryer, the second dryer, and the third dryer are each of a cylindrical structure in which a molecular sieve desiccant is arranged.

This application further provides a system for producing hydrogen by water electrolysis. The system for producing hydrogen by water electrolysis includes a module for producing hydrogen by water electrolysis and the system for purifying hydrogen according to any one described above, and the module for producing hydrogen by water electrolysis is in communication with the deoxygenation module of the system for purifying hydrogen.

This application further provides a method for purifying hydrogen through the system for purifying hydrogen according to any one described above. The method for purifying hydrogen includes:

- S01: introducing feed stream including hydrogen into the deoxygenation module for deoxygenation treatment, to obtain deoxygenated hydrogen;
- S02: introducing the deoxygenated hydrogen into the first dryer for drying treatment, to obtain purified hydrogen stream;
- S03: introducing a portion of the purified hydrogen stream as low-temperature regeneration hydrogen into the first gas channel of the first gas-gas heat exchanger for heat exchange treatment, to obtain high-temperature regeneration hydrogen;
- S04: stopping introducing the deoxygenated hydrogen to the second dryer, and introducing the high-temperature regeneration hydrogen into the second dryer to blow dry and regenerate a spent molecular sieve desiccant in the second dryer, to obtain high-temperature regeneration tail gas;
- S05: introducing the high-temperature regeneration tail gas into the second gas channel of the first gas-gas heat exchanger to exchange heat with the low-temperature regeneration hydrogen in the first gas channel, to obtain low-temperature regeneration tail gas;
- S06: introducing the low-temperature regeneration tail gas into the third dryer for drying treatment, to obtain recycled hydrogen stream; and
- S07: merging the recycled hydrogen stream and the purified hydrogen stream.

Optionally, in operation S04, a gas flow direction of the high-temperature regeneration hydrogen is opposite to a gas flow direction of the deoxygenated hydrogen introduced to the second dryer.

Optionally, the method for purifying hydrogen further includes: repeating operations S02 to S07, performing, in the second dryer, drying treatment on the deoxygenated hydrogen, blow drying and regenerating a spent molecular sieve desiccant in the third dryer, and performing, in the first dryer, drying treatment on the low-temperature regeneration tail gas; and/or

- repeating operations S02 to S07, performing, in the third dryer, drying treatment on the deoxygenated hydrogen, blow drying and regenerating a spent molecular sieve desiccant in the first dryer, and performing, in the second dryer, drying treatment on the low-temperature regeneration tail gas.

Optionally, after the spent molecular sieve desiccant in the second dryer is blow dried and regenerated by using the high-temperature regeneration hydrogen for preset duration in operation S04, the method for purifying hydrogen further includes:

S04-1: stopping introducing the low-temperature regeneration hydrogen in operation S03 into the first gas channel of the first gas-gas heat exchanger, and then introducing a portion of the purified hydrogen stream into a cooler for cooling treatment, to obtain blow-cooled hydrogen; and

S04-2: stopping introducing the high-temperature regeneration hydrogen in operation S04 into the second dryer, and then introducing the blow-cooled hydrogen into the second dryer to blow cool a regenerated molecular sieve desiccant in the second dryer, to continue to perform operations S05 to S07 by replacing the high-temperature regeneration tail gas in operation S05 with generated gas, where a gas flow direction of the blow-cooled hydrogen is the same as a gas flow direction of the high-temperature regeneration hydrogen in the second dryer.

Optionally, the introducing feed stream including hydrogen into the deoxygenation module for deoxygenation treatment, to obtain deoxygenated hydrogen in operation S01 includes:

introducing the feed stream including hydrogen sequentially into a first gas channel of a second gas-gas heat exchanger for heat exchange treatment, into a deoxygenator for deoxygenation treatment, and into a second gas channel of the second gas-gas heat exchanger to exchange heat with the feed stream including hydrogen in the first gas channel, to obtain the deoxygenated hydrogen.

Optionally, in operation S03, a volume of the portion of the purified hydrogen stream accounts for 10% to 15% of a total volume of the purified hydrogen stream.

Optionally, a temperature of the deoxygenation treatment in operation S01 is in a range of 85° C. to 100° C.; a temperature of the drying treatment in operation S02 is room temperature; a temperature of blow-drying and regeneration treatment in operation S04 is in a range of 250° C. to 300° C.; and a temperature of the drying treatment in operation S06 is room temperature.

Optionally, before the introducing the deoxygenated hydrogen into the first dryer in operation S02, the method for purifying hydrogen further includes:

introducing the deoxygenated hydrogen sequentially into a cooling condenser for condensation treatment, and into a second moisture separator for moisture separation treatment.

Optionally, before the introducing the low-temperature regeneration tail gas into the third dryer for drying treatment in operation S06, the method for purifying hydrogen further includes:

introducing the low-temperature regeneration tail gas sequentially into a regeneration cooler for condensation treatment, and into a first moisture separator for moisture separation treatment.

Optionally, the regeneration cycle module further includes a heater;

the second stream control module is specifically configured to allow a portion of the purified hydrogen stream to sequentially flow through the first gas channel of the first gas-gas heat exchanger, the heater, the second dryer, the second gas channel of the first gas-gas heat exchanger, and the third dryer to form a regeneration channel, to obtain the recycled hydrogen stream; and operation S03 specifically includes:

introducing a portion of the purified hydrogen stream as the low-temperature regeneration hydrogen into the first gas channel of the first gas-gas heat exchanger for heat exchange treatment, and then into the heater for heating treatment, to obtain the high-temperature regeneration hydrogen.

Optionally, a temperature of the heating treatment in operation S03 is in a range of 300° C. to 350° C.

Based on the foregoing technical solutions, one regeneration cycle module is shared by the three dryers in the system for purifying hydrogen in this application. This significantly reduces a quantity of regeneration cycle modules, and therefore, the manufacturing cost of the system is relatively low. In addition, a first gas-gas heat exchanger is arranged in a regeneration cycle system, so that heat exchange can be performed between low-temperature regeneration hydrogen before regeneration and high-temperature regeneration tail gas after regeneration. In this way, residual heat of the high-temperature regeneration tail gas can be fully utilized, and power consumption of a subsequent heater and regeneration cooler can be significantly reduced. Therefore, energy consumption of the system is relatively low.

Other features and advantages of this application will be described in detail in the following specific implementations.

BRIEF DESCRIPTION OF THE DRAWINGS

The accompanying drawings are provided for further understanding of this application and constitute a part of the specification, and explain this application together with the following specific implementations, but do not constitute a limitation to this application. In the accompanying drawings:

FIG. 1 is a schematic diagram of a structure of a system for purifying hydrogen in this application.

DESCRIPTION OF REFERENCE NUMERALS

Description of reference numerals:

| No. | Name | No. | Name |
|---|---|---|---|
| 1 | First dryer | 2 | Second dryer |
| 3 | Third dryer | 4 | First gas-gas heat exchanger |
| 5 | Heater | 6 | Regeneration cooler |
| 7 | First moisture separator | 8 | Cooler |
| 9 | Third moisture separator | 10 | Second gas-gas heat exchanger |
| 11 | Deoxygenator | 12 | Cooling condenser |
| 13 | Second moisture separator | 14 | First condensed water drain pipe |
| 15 | Second condensed water drain pipe | 16 | First temperature measurement device |
| 17 | Second temperature measurement device | 18 | Third temperature measurement device |
| 19 | Fourth temperature measurement device | 20 | Fifth temperature measurement device |
| 21 | Sixth temperature measurement device | 22 | Seventh temperature measurement device |

DETAILED DESCRIPTION

Specific implementations of this application are described in detail below with reference to the accompanying drawings. It should be understood that the specific implementations described herein are merely used for describing and illustrating this application rather than limiting this application.

According to a first aspect of this application, a system for purifying hydrogen is provided, configured to purify feed stream including hydrogen to generate purified hydrogen stream. As shown in FIG. 1, the system for purifying hydrogen may include: a deoxygenation module, a drying module, and a regeneration cycle module that are sequentially in communication with each other, where the drying module includes a first dryer 1, a second dryer 2, and a third dryer 3 that are connected in parallel; and the regeneration cycle module includes a first gas-gas heat exchanger 4 having a first gas channel and a second gas channel.

The system for purifying hydrogen further includes: a first stream control module, configured to allow the feed stream including hydrogen to sequentially flow through the deoxygenation module and the first dryer 1 to form a purification channel, to obtain the purified hydrogen stream; and a second stream control module, configured to allow a portion of the purified hydrogen stream to sequentially flow through the first gas channel of the first gas-gas heat exchanger 4, the second dryer 2, the second gas channel of the first gas-gas heat exchanger 4, and the third dryer 3 to form a regeneration channel, to obtain recycled hydrogen stream.

According to this application, the first dryer 1, the second dryer 2, and the third dryer 3 are each provided with a first opening and a second opening, where the first opening of the first dryer 1, the first opening of the second dryer 2, and the first opening of the third dryer 3 are configured to be respectively in communication with an outlet of the deoxygenation module, an inlet of the second gas channel of the first gas-gas heat exchanger 4, and an outlet of the second gas channel of the first gas-gas heat exchanger 4; and the second opening of the first dryer 1, the second opening of the second dryer 2, and the second opening of the third dryer 3 are configured to be respectively in communication with a purified hydrogen stream outlet, an inlet of the first gas channel of the first gas-gas heat exchanger 4, and a recycled hydrogen stream outlet, where the purified hydrogen stream outlet is configured to output the purified hydrogen stream, and the recycled hydrogen stream outlet is configured to output the recycled hydrogen stream.

In this application, specifically, openings (including outlets and inlets) may be in communication with each other through a gas delivery pipe. When a plurality of openings are in communication with the same another opening, the plurality of openings may be independently in communication with the another opening, or the plurality of openings may be connected in parallel and be in communication with the another opening through one gas delivery pipe. To save manufacturing cost of the system and reduce complexity of the system, when the plurality of openings are in communication with the same another opening, in this application, it is preferred that the plurality of openings are connected in parallel and then are in communication with the another opening through one gas delivery pipe.

For example, as shown in FIG. 1, in the system for purifying hydrogen provided in this application, the first opening of the first dryer, the first opening of the second dryer, and the first opening of the third dryer may be connected in parallel with each other, and then be respectively in communication with the outlet of the deoxygenation module, the inlet of the second gas channel of the first gas-gas heat exchanger, and the outlet of the second gas channel of the first gas-gas heat exchanger through different pipes; and the second opening of the first dryer, the second opening of the second dryer, and the second opening of the third dryer may also be connected in parallel with each other, and then be respectively in communication with the purified hydrogen stream outlet, the inlet of the first gas channel of the first gas-gas heat exchanger, and the recycled hydrogen stream outlet through different pipes.

The system for purifying hydrogen provided in this application may be specifically configured to purify hydrogen produced by water electrolysis. The deoxygenation module may be configured to remove a small amount of oxygen in the hydrogen produced by water electrolysis, the drying module may be configured to remove a large amount of water vapor in the hydrogen produced by water electrolysis, and the regeneration cycle module may be configured to heat a cold gas flow before regeneration and cool a hot gas flow after regeneration during regeneration of the desiccant.

The system for purifying hydrogen provided in this application can simultaneously achieve purification on the feed stream including hydrogen, regeneration on a spent desiccant in each dryer, and recovery on regeneration tail gas. Specifically, any dryer may be used to purify the feed stream including hydrogen and regenerate a spent desiccant in another dryer, and a remaining dryer is used to dry and recover the regeneration tail gas.

Specifically, during operation of the system for purifying hydrogen provided in this application, the feed stream including hydrogen may be first introduced into the deoxygenation module for deoxygenation treatment, to obtain deoxygenated hydrogen; the deoxygenated hydrogen is introduced into any dryer through a first opening of the dryer for drying treatment, to obtain purified hydrogen stream, and a portion of the purified hydrogen stream is introduced as low-temperature regeneration hydrogen into the first gas channel of the first gas-gas heat exchanger through the inlet of the first gas channel of the first gas-gas heat exchanger for heat exchange treatment, to obtain high-temperature regeneration hydrogen; the high-temperature regeneration hydrogen is introduced into another dryer through a second opening of the dryer to blow dry and regenerate a spent molecular sieve desiccant in the dryer to obtain high-temperature regeneration tail gas, the obtained high-temperature regeneration tail gas flows out of a first opening of the dryer, enters the second gas channel of the first gas-gas heat exchanger through the inlet of the second gas channel of the first gas-gas heat exchanger to exchange heat with the low-temperature regeneration hydrogen in the first gas channel of the first gas-gas heat exchanger, and then flows out of the outlet of the second gas channel of the first gas-gas heat exchanger, to obtain low-temperature regeneration tail gas; the low-temperature regeneration tail gas flows into a remaining dryer through a first opening of the dryer for drying treatment and then flows out of a second opening of the dryer, to obtain recycled hydrogen stream, and the recycled hydrogen stream flows out of the recycled hydrogen stream outlet; and finally, the purified hydrogen stream flowing out of the purified hydrogen stream outlet and the recycled hydrogen stream flowing out of the recycled hydrogen stream outlet are merged, to obtain pure hydrogen.

The operations may be performed in turn in each of the dryers to achieve continuous purification on the feed stream including hydrogen. For example, the deoxygenated hydrogen may be first dried in the first dryer, a spent molecular sieve desiccant in the second dryer is blow dried and regenerated, and the low-temperature regeneration tail gas is dried in the third dryer. Then, the deoxygenated hydrogen is dried in the second dryer, a spent molecular sieve desiccant in the third dryer is blow dried and regenerated, and the low-temperature regeneration tail gas is dried in the first dryer. Finally, the deoxygenated hydrogen is dried in the third dryer, a spent molecular sieve desiccant in the first dryer is blow dried and regenerated, and the low-temperature regeneration tail gas is dried in the second dryer. In this way, a closed-loop circulation process is formed, thereby achieving continuous purification on the feed stream including hydrogen.

In this application, one regeneration cycle module is shared by the three dryers in the system for purifying hydrogen. This significantly reduces a quantity of regeneration cycle modules, and therefore, the manufacturing cost of the system is relatively low. In addition, a first gas-gas heat exchanger is arranged in a regeneration cycle module, so that heat exchange can be performed between low-temperature regeneration hydrogen before regeneration and high-temperature regeneration tail gas after regeneration. In this way, residual heat of the high-temperature regeneration tail gas can be fully utilized, and power consumption of a subsequent heater and regeneration cooler can be significantly reduced. Therefore, energy consumption of the system is relatively low.

According to this application, the first stream control module may include at least one first control valve, and the second stream control module may include at least one second control valve. The at least one first control valve may be arranged between the outlet of the deoxygenation module and the first opening of each of the dryers and between the purified hydrogen stream outlet and the second opening of each of the dryers. The at least one second control valve may be arranged between the inlet of the first gas channel of the first gas-gas heat exchanger 4 and the second opening of each of the dryers, between the inlet of the second gas channel of the first gas-gas heat exchanger 4 and the first opening of each of the dryers, between the outlet of the second gas channel of the first gas-gas heat exchanger 4 and the first opening of each of the dryers, and between the recycled hydrogen stream outlet and the second opening of each of the dryers.

In this application, specifically, types of the first control valve and the second control valve may be selected within a range. For example, the control valve may be a pneumatic ball valve. By controlling to open and close the first control valve or the second control valve, switching flow paths between different openings can be implemented, to prevent a gas flow from entering another flow path. For example, a first control valve between the outlet of the deoxygenation module and the first opening of the first dryer is opened, and first control valves between the outlet of the deoxygenation module and the first opening of the second dryer as well as the first opening of the third dryer are closed, so that a flow path between the deoxygenation module and the first dryer can be opened, and flow paths between the deoxygenation module and the second dryer as well as the third dryer are closed. In this way, the deoxygenated hydrogen enters the first dryer, and does not enter the second dryer and the third dryer.

In this application, the regeneration cycle module further includes a heater 5; and the second stream control module is specifically configured to allow a portion of the purified hydrogen stream to sequentially flow through the first gas channel of the first gas-gas heat exchanger 4, the heater 5, the second dryer 2, the second gas channel of the first gas-gas heat exchanger 4, and the third dryer 3 to form a regeneration channel, to obtain the recycled hydrogen stream.

In this application, one regeneration cycle module is shared by the three dryers in the system for purifying hydrogen, and the regeneration cycle module includes a heater. Therefore, in this application, a quantity of heaters is significantly reduced, and manufacturing cost of the system is relatively low. In addition, a first gas-gas heat exchanger is arranged in a regeneration cycle system, so that heat exchange can be performed between low-temperature regeneration hydrogen before regeneration and high-temperature regeneration tail gas after regeneration. In this way, residual heat of the high-temperature regeneration tail gas can be fully utilized, and power consumption of a subsequent heater and regeneration cooler can be significantly reduced. Therefore, energy consumption of the system is relatively low.

According to this application, the second opening of the first dryer 1, the second opening of the second dryer 2, and the second opening of the third dryer 3 are further configured to be respectively in communication with an outlet of the heater 5; and an outlet of the first gas channel of the first gas-gas heat exchanger 4 is in communication with an inlet of the heater 5. A portion of the purified hydrogen stream is introduced as low-temperature regeneration hydrogen into the first gas channel of the first gas-gas heat exchanger through the inlet of the first gas channel of the first gas-gas heat exchanger for heat exchange treatment, and then into the heater through the outlet of the first gas channel of the first gas-gas heat exchanger and the inlet of the heater for heating treatment, to obtain high-temperature regeneration hydrogen.

According to this application, the at least one second control valve is further arranged between an outlet of the heater 5 and the second opening of each of the dryers.

According to this application, a sixth temperature measurement device 21 may be arranged on the heater 5, and a seventh temperature measurement device 22 may be arranged at an outlet of the heater 5.

In this application, the regeneration cycle module may further include: a cooler 8, configured to cool the second dryer 2; and a third stream control module, configured to allow a portion of the purified hydrogen stream to sequentially flow through the cooler 8, the second dryer 2, the second gas channel of the first gas-gas heat exchanger 4, and the third dryer 3, to form a regeneration cooling channel.

An inlet of the cooler 8 is configured to be respectively in communication with a second opening of the first dryer 1, a second opening of the second dryer 2, and a second opening of the third dryer 3, and an outlet of the cooler 8 is configured to be respectively in communication with the second opening of the first dryer 1, the second opening of the second dryer 2, and the second opening of the third dryer 3.

In this application, one regeneration cycle module is shared by the three dryers in the system for purifying hydrogen, and the regeneration cycle module includes a heater and a cooler. Therefore, in this application, a quantity of heaters and a quantity of coolers are significantly reduced, and manufacturing cost of the system is relatively low.

In this application, specifically, a type of the cooler 8 may be selected within a range. For example, the cooler may be a blow cooler that is mainly configured to cool, after a desiccant is regenerated for a period of time, a portion of purified hydrogen stream from a dryer for drying the feed stream including hydrogen, and cooled purified hydrogen stream is introduced into a dryer for desiccant regeneration to quickly cool a high-temperature regenerated desiccant obtained after regeneration. In this way, duration of the regeneration process can be shortened, and the regenerated desiccant can be in a low temperature state to improve its adsorption capacity.

In other words, the regeneration process of the spent desiccant in the system in this application includes at least two operations. The first operation is to remove moisture from the spent desiccant by using the high-temperature regeneration hydrogen heated through the first gas-gas heat exchanger and the heater. The second operation is to quickly cool, by using low-temperature purified hydrogen stream cooled through the cooler, a high-temperature regenerated desiccant obtained by performing the first operation.

According to this application, the third stream control module may include at least one third control valve, where the at least one third control valve may be arranged between the inlet of the cooler 8 and the second opening of each of the dryers and/or between the outlet of the cooler 8 and the second opening of each of the dryers. Through controlling of the third control valve, the portion of purified hydrogen stream from the dryer for drying the feed stream including hydrogen flows to the cooler 8, and does not flow to the first gas channel of the first gas-gas heat exchanger 4.

According to this application, the regeneration cycle module may further include a regeneration cooler 6 and a first moisture separator 7, where an inlet of the regeneration cooler 6 is in communication with an outlet of the second gas channel of the first gas-gas heat exchanger 4, an outlet of the regeneration cooler 6 is in communication with an inlet of the first moisture separator 7, and an outlet of the first moisture separator 7 is configured to be respectively in communication with a first opening of the first dryer 1, a first opening of the second dryer 2, or a first opening of the third dryer 3.

According to this application, the deoxygenation module may further include a second gas-gas heat exchanger 10 and a deoxygenator 11, and the second gas-gas heat exchanger 10 has a first gas channel and a second gas channel, where an outlet of the first gas channel of the second gas-gas heat exchanger 10 is in communication with an inlet of the deoxygenator 11, an outlet of the deoxygenator 11 is in communication with an inlet of the second gas channel of the second gas-gas heat exchanger 10, and an outlet of the second gas channel of the second gas-gas heat exchanger 10 is configured to be respectively in communication with a first opening of the first dryer 1, a first opening of the second dryer 2, and a first opening of the third dryer 3.

In this application, specifically, with arrangement of the second gas-gas heat exchanger, a hot hydrogen gas flow that is deoxygenated in the deoxygenator can flow back into the second gas channel of the second gas-gas heat exchanger, and exchange heat with low-temperature feed stream including hydrogen flowing through the first gas channel to heat the low-temperature feed stream including hydrogen, so that a temperature of the feed stream including hydrogen is increased, and a temperature of the deoxygenated hydrogen is decreased, which can effectively reduce power consumption of the deoxygenator and a subsequent cooling condenser.

According to this application, the system for purifying hydrogen may further include a cooling condenser 12 and a second moisture separator 13, where an inlet of the cooling condenser 12 is in communication with the outlet of the second gas channel of the second gas-gas heat exchanger 10, an outlet of the cooling condenser 12 is in communication with an inlet of the second moisture separator 13, and an outlet of the second moisture separator 13 is configured to be respectively in communication with the first opening of the first dryer 1, the first opening of the second dryer 2, and the first opening of the third dryer 3.

According to this application, a first condensed water drain pipe 14 may be further arranged between an inlet of the second gas channel of the first gas-gas heat exchanger 4 and the first opening of each of the dryers, where an end of the first condensed water drain pipe 14 is in communication with both the inlet of the second gas channel of the first gas-gas heat exchanger 4 and the first opening of each of the dryers; and a second condensed water drain pipe 15 may be further arranged between the inlet of the second gas channel of the second gas-gas heat exchanger 10 and the outlet of the deoxygenator 11, where the second condensed water drain pipe 15 is in communication with both the inlet of the second gas channel of the second gas-gas heat exchanger 10 and the outlet of the deoxygenator 11. Both the first condensed water drain pipe and the second condensed water drain pipe are configured to drain condensed water accumulated in a gas flow path, to prevent the condensed water from entering the gas-gas heat exchanger and affecting a heat exchange effect.

According to this application, a control valve may be arranged on each of the first condensed water drain pipe 14 and the second condensed water drain pipe 15.

According to this application, a first temperature measurement device 16 may be arranged on the deoxygenator 11, a second temperature measurement device 17 may be arranged at the outlet of the deoxygenator 11, a third temperature measurement device 18 may be arranged at the first opening of the first dryer 1, a fourth temperature measurement device 19 may be arranged at the first opening of the second dryer 2, and a fifth temperature measurement device 20 is arranged at the first opening of the third dryer 3.

According to this application, the first dryer 1, the second dryer 2, and the third dryer 3 are each of a cylindrical structure in which a molecular sieve desiccant is arranged. Because one gas-gas heat exchanger and heater are shared by the dryers in the system in this application, there is no need to arrange an electric heating device in every dryer, thereby achieving a significant effect of energy saving and emission reduction.

According to a second aspect of this application, a system for producing hydrogen by water electrolysis is further provided. The system for producing hydrogen by water electrolysis may include a module for producing hydrogen by water electrolysis and the system for purifying hydrogen according to any one described above, and the module for producing hydrogen by water electrolysis is in communication with the deoxygenation module of the system for purifying hydrogen.

According to a third aspect of this application, a method for purifying hydrogen through the system according to any one described above. The method may include operation S01 to operation S07.

In operation S01, feed stream including hydrogen is introduced into the deoxygenation module for deoxygenation treatment, to obtain deoxygenated hydrogen. The feed stream including hydrogen may be, for example, hydrogen produced by water electrolysis.

In operation S02, the deoxygenated hydrogen is introduced into the first dryer for drying treatment, to obtain the purified hydrogen stream.

In operation S03, a portion of the purified hydrogen stream is introduced as low-temperature regeneration hydrogen into the first gas channel of the first gas-gas heat exchanger for heat exchange treatment, to obtain high-temperature regeneration hydrogen.

In operation S04, introduction of the deoxygenated hydrogen to the second dryer is stopped, and the high-temperature regeneration hydrogen is introduced into the second dryer to blow dry and regenerate a spent molecular sieve desiccant in the second dryer, to obtain high-temperature regeneration tail gas.

In operation S05, the high-temperature regeneration tail gas is introduced into the second gas channel of the first gas-gas heat exchanger to exchange heat with the low-temperature regeneration hydrogen in the first gas channel, to obtain low-temperature regeneration tail gas.

In operation S06, the low-temperature regeneration tail gas is introduced into the third dryer for drying treatment, to obtain recycled hydrogen stream.

In operation S07, the recycled hydrogen stream and the purified hydrogen stream are merged.

According to this application, in operation S04, a gas flow direction of the high-temperature regeneration hydrogen is opposite to a gas flow direction of the deoxygenated hydrogen introduced to the second dryer.

According to this application, the method for purifying hydrogen may further include the following operations: repeating operations S02 to S07, performing, in the second dryer, drying treatment on the deoxygenated hydrogen, blow drying and regenerating a spent molecular sieve desiccant in the third dryer, and performing, in the first dryer, drying treatment on the low-temperature regeneration tail gas; and/or repeating operations S02 to S07, performing, in the third dryer, drying treatment on the deoxygenated hydrogen, blow drying and regenerating a spent molecular sieve desiccant in the first dryer, and performing, in the second dryer, drying treatment on the low-temperature regeneration tail gas.

According to this application, after the spent molecular sieve desiccant in the second dryer is blow dried and regenerated by using the high-temperature regeneration hydrogen for preset duration in operation S04, the method for purifying hydrogen may further include operation S04-1 and operation S04-2.

In operation S04-1, the low-temperature regeneration hydrogen in operation S03 stops being introduced into the first gas channel of the first gas-gas heat exchanger, and then a portion of the purified hydrogen stream is introduced into the cooler for cooling treatment, to obtain blow-cooled hydrogen.

In operation S04-2, the high-temperature regeneration hydrogen in operation S04 stops being introduced into the second dryer, and then the blow-cooled hydrogen is introduced into the second dryer to blow cool a regenerated molecular sieve desiccant in the second dryer, to continue to perform operations S05 to S07 by replacing the high-temperature regeneration tail gas in operation S05 with generated gas, where a gas flow direction of the blow-cooled hydrogen is the same as a gas flow direction of the high-temperature regeneration hydrogen in the second dryer.

According to this application, the introducing feed stream including hydrogen into the deoxygenation module for deoxygenation treatment, to obtain deoxygenated hydrogen in operation S01 may include: introducing the feed stream including hydrogen sequentially into a first gas channel of the second gas-gas heat exchanger for heat exchange treatment, into a deoxygenator for deoxygenation treatment, and into a second gas channel of the second gas-gas heat exchanger to exchange heat with the feed stream including hydrogen in the first gas channel, to obtain the deoxygenated hydrogen.

According to this application, in operation S03, a volume of the portion of the purified hydrogen stream may account for 10% to 15% of a total volume of the purified hydrogen stream.

According to this application, a temperature of the deoxygenation treatment in operation S01 may be in a range of 85° C. to 100° C.; a temperature of the drying treatment in operation S02 may be room temperature; a temperature of blow-drying and regeneration treatment in operation S04 may be in a range of 250° C. to 300° C.; and a temperature of the drying treatment in operation S06 may be room temperature.

According to this application, before the introducing the deoxygenated hydrogen into the first dryer in operation S02, the method for purifying hydrogen further includes: introducing the deoxygenated hydrogen sequentially into a cooling condenser for condensation treatment, and into a second moisture separator for moisture separation treatment.

According to this application, before the introducing the low-temperature regeneration tail gas into the third dryer for drying treatment in operation S06, the method for purifying hydrogen further includes: introducing the low-temperature regeneration tail gas sequentially into a regeneration cooler for condensation treatment, and into a first moisture separator for moisture separation treatment.

According to this application, the regeneration cycle module further includes a heater;

the second stream control module is specifically configured to allow a portion of the purified hydrogen stream to sequentially flow through the first gas channel of the first gas-gas heat exchanger, the heater, the second dryer, the second gas channel of the first gas-gas heat exchanger, and the third dryer to form a regeneration channel, to obtain the recycled hydrogen stream; and operation S03 specifically includes:

introducing a portion of the purified hydrogen stream as the low-temperature regeneration hydrogen into the first gas channel of the first gas-gas heat exchanger for heat exchange treatment, and then into the heater for heating treatment, to obtain the high-temperature regeneration hydrogen.

Optionally, a temperature of the heating treatment in operation S03 is in a range of 300° C. to 350° C.

It should be noted that, in the embodiments of this application, implementations of the method part are the same as or similar to the implementations of the system part, and details are not described herein again.

This application is further illustrated by using the following embodiments, but this application is not limited thereto. All raw materials, reagents, instruments, and devices involved in the embodiments of this application can be purchased unless otherwise specified.

Embodiment 1

Based on the system shown in FIG. 1, the hydrogen produced by water electrolysis may be purified by using the following method:

(1) introducing the feed stream including hydrogen into a first gas channel of a second gas-gas heat exchanger for heat exchange treatment, into a deoxygenator for deoxygenation treatment, and finally into a second gas channel of the second gas-gas heat exchanger to exchange heat with the feed stream including hydrogen in the first gas channel, to obtain the deoxygenated hydrogen;

(2) introducing the deoxygenated hydrogen into the cooling condenser for condensation treatment, into the second moisture separator for moisture separation treatment, and then into the first dryer through the first opening of the first dryer for drying treatment, to obtain purified hydrogen stream;

(3) introducing 15% of the purified hydrogen stream as the low-temperature regeneration hydrogen into the first gas channel of the first gas-gas heat exchanger for heat exchange treatment, and then into the heater for heating treatment, to obtain the high-temperature regeneration hydrogen;

(4) stopping introducing the deoxygenated hydrogen to the first opening of the second dryer, and introducing the high-temperature regeneration hydrogen into the second dryer through the second opening of the second dryer to blow dry and regenerate a spent molecular sieve desiccant in the second dryer, to obtain high-temperature regeneration tail gas;

(5) after the end of blow drying and regeneration treatment in step (4), stopping introducing the low-temperature regeneration hydrogen in step (3) into the first gas channel of the first gas-gas heat exchanger, and then introducing a portion of the purified hydrogen stream into a cooler for cooling treatment, to obtain blow-cooling hydrogen; and stopping introducing the high-temperature regeneration hydrogen in step (4) into the second dryer, and then introducing the blow-cooled hydrogen into the second dryer to blow cool a regenerated molecular sieve desiccant in the second dryer, to obtain blow-cooling hydrogen, and performing step (6);

(6) introducing the high-temperature regeneration tail gas obtained in step (4) or the blow-cooling hydrogen obtained in step (5) into the second gas channel of the first gas-gas heat exchanger to exchange heat with the low-temperature regeneration hydrogen in the first gas channel of the first gas-gas heat exchanger, and then sequentially flow through the regeneration cooler and the first moisture separator, to obtain low-temperature regeneration tail gas;

(7) introducing the low-temperature regeneration tail gas into the third dryer for drying treatment, to obtain recycled hydrogen stream;

(8) after the operations in steps (2) to (7) last for 24 hours, transferring the operations related to the dryer in steps (2) and (3) to the second dryer, transferring the operations related to the dryer in steps (4) to (6) to the third dryer, and transferring the operations related to the dryer in step (7) to the first dryer;

(9) after 24 hours, transferring the operations related to the dryer in steps (2) and (3) to the third dryer, transferring the operations related to the dryer in steps (4) to (6) to the first dryer, and transferring the operations related to the dryer in step (7) to the second dryer; and

(10) merging all purified hydrogen stream and all recycled hydrogen stream to obtain a hydrogen product, and repeatedly performing the operations in steps (1) to (9), to implement continuous purification on the hydrogen produced by water electrolysis.

Preferred implementations of this application are described in detail above with reference to the accompanying drawings. However, this application is not limited to the specific details in the foregoing implementations. In the scope of the technical idea of this application, many simple variations can be made to the technical solutions of this application, and the simple variations all fall within the protection scope of this application.

In addition, it should be noted that, the specific technical features described in the foregoing specific implementations may be combined in any suitable manner without contradiction. To avoid unnecessary repetition, various possible combinations are not further described in this application.

Furthermore, the various implementations of this application may be combined without departing from the idea of this application, and such combinations shall also be regarded as content disclosed in this application.

What is claimed is:

1. A system for purifying a feed stream comprising hydrogen, wherein the system comprises:

a drying module comprising a first dryer and a second dryer;

a regeneration cycle module connected to the drying module, wherein the regeneration cycle module comprises a first heat exchanger having a first gas channel and a second gas channel;

a first stream control module configured to introduce the feed stream into the first dryer to produce a purified hydrogen stream; and a second stream control module configured to:

introduce a first portion of the purified hydrogen stream into the first gas channel of the first heat exchanger to heat the first portion of the purified hydrogen stream;

introduce the first portion of the purified hydrogen stream after heating into the second dryer to regenerate a desiccant in the second dryer; and introduce a regeneration tail gas of the second dryer into the second gas channel of the first heat exchanger to exchange heat with the first gas channel of the first heat exchanger, wherein the regeneration tail gas comprises the first portion of the purified hydrogen stream that passes through the second dryer.

2. The system according to claim 1, wherein the drying module comprises a third dryer, wherein the second stream control module is configured to:

introduce the regeneration tail gas of the second dryer from the second gas channel of the first heat exchanger into the third dryer to produce a recycled hydrogen stream.

3. The system according to claim 2, wherein the first dryer, the second dryer, and the third dryer are connected to the regeneration cycle module in parallel.

4. The system according to claim 2, wherein the system further comprises a deoxygenation module for removing oxygen from the feed stream, wherein the first stream control module is configured to introduce the feed stream into the deoxygenation module before introducing the feed stream into the first dryer.

5. The system according to claim 4, wherein the deoxygenation module comprises a deoxygenator and a second heat exchanger, wherein the first stream control module is configured to:

introduce the feed stream into a first gas channel of the second heat exchanger to heat the feed stream;

introduce the feed stream after heating into the deoxygenator to remove oxygen from the feed stream; and introduce the feed stream from the deoxygenator into a second gas channel of the second heat exchanger to exchange heat with the first gas channel of the second heat exchanger.

6. The system according to claim 4, wherein the first dryer, the second dryer, and the third dryer each have a first opening and a second opening, wherein the first opening of the first dryer, the first opening of the second dryer, and the first opening of the third dryer are each connected to:

an outlet of the deoxygenation module;

an inlet of the second gas channel of the first heat exchanger; and an outlet of the second gas channel of the first heat exchanger, and wherein the second opening of the first dryer, the second opening of the second dryer, and the second opening of the third dryer are each connected to:

a first outlet for outputting the purified hydrogen stream;

an inlet of the first gas channel of the first heat exchanger; and a second outlet for outputting the recycled hydrogen stream.

7. The system according to claim 6, wherein the first stream control module comprises a first control valve located in at least one of the following positions:

between the outlet of the deoxygenation module and the first openings of the first dryer, the second dryer and the third dryer; or between the first outlet and the second openings of the first dryer, the second dryer and the third dryer.

8. The system according to claim 6, wherein the second stream control module comprises a second control valve located in one of the following positions:

between the inlet of the first gas channel of the first heat exchanger and the second openings of the first dryer, the second dryer and the third dryer;

between the inlet of the second gas channel of the first heat exchanger and the first openings of the first dryer, the second dryer and the third dryer;

between the outlet of the second gas channel of the first heat exchanger and the first openings of the first dryer, the second dryer and the third dryer; or between the second outlet and the second openings of the first dryer, the second dryer and the third dryer.

9. The system according to claim 1, wherein the regeneration cycle module further comprises a heater for heating the first portion of the purified hydrogen stream, and wherein the second stream control module is configured to:

prior to introducing the first portion of the purified hydrogen stream into the second dryer, introduce the first portion of the purified hydrogen stream from the first gas channel of the first heat exchanger into the heater.

10. The system according to claim 2, wherein the regeneration cycle module further comprises a cooler, and wherein the system further comprises a third stream control module configured to sequentially introduce a second portion of the purified hydrogen stream into:

the cooler to cool the second portion of the purified hydrogen stream;

the second dryer to cool the desiccant in the second dryer; and the second gas channel of the first heat exchanger to exchange heat with the first gas channel of the first heat exchanger.

11. The system according to claim 10, wherein an inlet of the cooler is connected to a second opening of the first dryer, a second opening of the second dryer, and a second opening of the third dryer, and wherein an outlet of the cooler is connected to the second opening of the first dryer, the second opening of the second dryer, and the second opening of the third dryer.

12. The system according to claim 11, wherein the third stream control module comprises a third control valve, wherein the third control valve is located in one of the following positions:

between the inlet of the cooler and the second openings of the first dryer, the second dryer and the third dryer; or between the outlet of the cooler and the second openings of the first dryer, the second dryer and third dryer.

13. A method for purifying a feed stream comprising hydrogen, comprising:

introducing the feed stream into a first dryer to produce a purified hydrogen stream;

regenerating a desiccant in a second dryer using a first portion of the purified hydrogen stream, comprising:

introducing the first portion of the purified hydrogen stream into a first gas channel of a first heat exchanger to heat the first portion of the purified hydrogen stream;

introducing the first portion of the purified hydrogen stream after heating into the second dryer to regenerate the desiccant; and introducing a regeneration tail gas from the second dryer into a second gas channel of the first heat exchanger to exchange heat with the first gas channel of the first heat exchanger, wherein the first portion of the purified hydrogen stream is comprised in the regeneration tail gas.

14. The method of claim 13, further comprising recycling the first portion of the purified hydrogen stream, comprising:

introducing the regeneration tail gas from the second dryer into a third dryer to produce a recycled hydrogen stream.

15. The method of claim 14, wherein recycling the first portion of the purified hydrogen stream further comprises:

prior to introducing the regeneration tail gas into the third dryer, introducing the regeneration tail gas into a first cooler for condensation treatment and into a moisture separator for separating moisture from the first portion of hydrogen stream comprised in the regeneration tail gas.

16. The method of claim 13, further comprising:

prior to introducing the feed stream into the first dryer, introducing the feed stream into a deoxygenator to remove oxygen from the feed stream.

17. The method of claim 16, further comprising:

prior to introducing the feed stream into the deoxygenator, introducing the feed stream into a first gas channel of a second heat exchanger to heat the feed stream; and after introducing the feed stream into the deoxygenator to produce a deoxygenated stream, introducing the deoxygenated stream into a second gas channel of the second heat exchanger to exchange heat with the first gas channel of the second heat exchanger.

18. The method of claim 13, wherein a volume of the first portion of the purified hydrogen stream accounts for 10% to 15% of a volume of the purified hydrogen stream.

19. The method of claim 13, further comprising:

cooling the desiccant in the second dryer using a second portion of the purified hydrogen stream, comprising:

introducing the second portion of the purified hydrogen stream into a second cooler to cool the second portion of the purified hydrogen stream;

introducing the second portion of the purified hydrogen stream after cooling into the second dryer to cool the desiccant in the second dryer; and introducing the second portion of the purified hydrogen stream from the second dryer to the second gas channel of the first heat exchanger to exchange heat with the first gas channel of the first heat exchanger.

20. A system for producing hydrogen by water electrolysis, comprising:

a water electrolysis module for producing a feed stream comprising hydrogen;

a deoxygenation module for removing oxygen from the feed stream;

a drying module for removing water vaper from the feed stream, wherein the drying module comprises a first dryer and a second dryer;

a regeneration cycle module for regenerating desiccants in the drying module, wherein the regeneration cycle module comprises a first heat exchanger having a first gas channel and a second gas channel;

a first stream control module configured to introduce the feed stream into the deoxygenation module and the first dryer to produce a purified hydrogen stream; and a second stream control module configured to:

introduce a portion of the purified hydrogen stream into the first gas channel of the first heat exchanger to heat the portion of the purified hydrogen stream;

introduce the portion of the purified hydrogen stream after heating into the second dryer to regenerate a desiccant in the second dryer; and introduce a regeneration tail gas of the second dryer into the second gas channel of the first heat exchanger to exchange heat with the first gas channel of the first heat exchanger, wherein the regeneration tail gas comprises the portion of the purified hydrogen stream that passes through the second dryer.

* * * * *